C. W. BRITCHER & J. R. VEZINA.
TICKET REGISTERING DEVICE.
APPLICATION FILED JAN. 18, 1918.

1,291,753.

Patented Jan. 21, 1919.
2 SHEETS—SHEET 1.

INVENTORS,
Charles W. Britcher,
Joseph R. Vezina,
BY
Harry W. Bown
ATTORNEY.

C. W. BRITCHER & J. R. VEZINA.
TICKET REGISTERING DEVICE.
APPLICATION FILED JAN. 18, 1918.

1,291,753.

Patented Jan. 21, 1919.
2 SHEETS—SHEET 2.

INVENTORS,
Charles W. Britcher,
Joseph R. Vezina,
BY Harry W. Bourn.
ATTORNEY.

UNITED STATES PATENT OFFICE.

CHARLES W. BRITCHER AND JOSEPH ROMEO VEZINA, OF SPRINGFIELD, MASSACHUSETTS.

TICKET-REGISTERING DEVICE.

1,291,753.   Specification of Letters Patent.   Patented Jan. 21, 1919.

Application filed January 18, 1918. Serial No. 212,466.

*To all whom it may concern:*

Be it known that we, CHARLES WILLIAM BRITCHER and JOSEPH ROMEO VEZINA, citizens of the United States of America, residing at Springfield, in the county of Hampden and State of Massachusetts, have invented certain new and useful Improvements in Ticket-Registering Devices, of which the following is a specification.

This invention relates to a machine for punching and auditing sales checks which are used, for example, in lunch rooms for indicating the amount of the order. At the present time it is a common practice in lunch rooms and hotels, for instance, for the waiter or person who serves the guest the order, to indicate the amount of the order on a suitable check bearing numerals, by punching out with a hand punch the figures or numerals that indicate the charge. These checks as at present constructed, usually consist of a small rectangular shaped piece of cardboard bearing on one side a column or columns of figures, or numerals, say from 5 to 100 in multiples of five, to indicate the amount in cents of the purchase. These checks, after being punched by the waiter to indicate the amount of the purchase, are presented by the customer, or guest, to the cashier as he leaves the room. This system of sales is defective in that there is no reliable means for correctly determining the amount of sales for the day, or, the amount of sales made by any one clerk or waiter for the reason that if the cashier should fail for some reason or other to register the sales indicated by the punched check, and this check should be destroyed, the proprietor cannot determine the status of his establishment from a financial standpoint. Oftentimes the proprietor wishes to determine which one of his clerks or salesmen or waiters are selling the largest quantity of goods, or have waited on the largest number of persons. The object and nature of the present invention is, therefore, designed to overcome the objections referred to.

Broadly considered, the invention comprises a suitable mechanism for receiving the check bearing the numerals indicating the sales or the amount of the meal served the guest or customer, devices for punching the check in a space adjacent the numerals to indicate the amount of the purchase sale, or meal served, devices for locking the check in the machine against removal until the machine has registered the number of the check perforated and the total amount or audit of the sales, also devices to permit the punching of the check should it be required to register an additional order, say for 20¢ the first order being 45¢. In other words, to indicate 65¢ on the check instead of 45¢; to register this additional amount, and, at the same time to prevent the machine from recording the number of an additional check, as for example, if the number of the check that has been punched indicating the numeral 45¢ should be the tenth check punched on the machine, it may be adjusted so that it would not, upon being operated the second time on the same check, to punch the numeral 65¢, register it as the eleventh check. It should, and does, register this check as number ten and not number eleven. Other advantages and operations will be fully described in the specification with reference to the drawings and the claims appended thereto.

Referring briefly to the drawings.

The various parts of the machine are shown in their normal or inoperative positions when the machine is ready for operation after a check has been inserted. The same reference numerals are understood as referring to the same parts throughout the several views.

Referring to the drawings in detail:—

Figure 1:
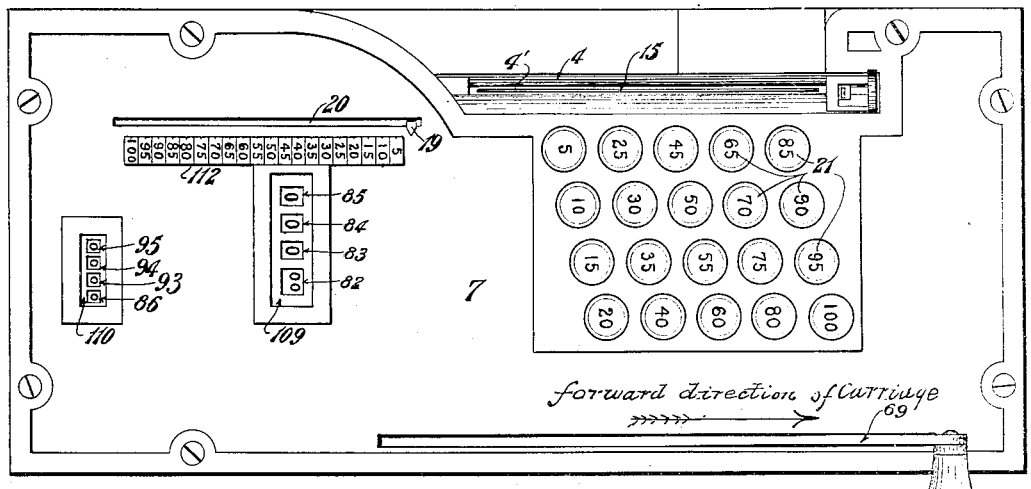
Figure 1 is a top plan view of the upper side of the case of the machine showing the arrangement of keys, the totaling scale, the location of the check slot, and dial sights for indicating the amount of the total sales and the number of the check.

The base 1, posts 2 and the bearing frame 3 constitute in general, the frame-work of the machine. The check receiving carriage is indicated at 4 and travels on the lower track 5, (Figs. 3 and 5) in the base part of the machine, and is retained in its vertical or upright position by means of the upper trackway 6 on the bottom side of the top plate 7 of the case. The form of sales check used is indicated in Fig. 6 at 4'. The grooved lower track 5 in which the check carriage 4 travels, is also designated by the dotted line 5 in Fig. 4. The rectangular opening 8 shown in Figs. 3 and 4, in the check receiving carriage 4 permits the punch head 9, which is a part of the crosshead 10 (see Fig. 3), to travel the full length of its stroke toward the left hand end of Figs. 4 and 5, without striking this carriage, it being understood that the position or point in which the punch head 9 comes to rest, depends upon the amount or sum to be punched in the check. The dotted lines 11, 12, 13 and 14 in Fig. 4, show the length and depth of the vertically arranged check slot 15 in the check carriage 4, which carriage is shown in section in Fig. 3. The slot is slightly longer than the check 4' shown in Fig. 6 in order to permit the latter to readily drop into and be removed therefrom without binding, and, at the same time not allow it too much play. The dotted lines 12 and 14, in Fig. 4, indicate the surface upon which the lower edge of the check rests when it is to be punched. It is of such a depth that when the check 4' is placed in position in the slot 15 of the check carriage 4 for punching, and a line as 6' is drawn lengthwise through the center of the twenty blank squares 4² adjacent the numerals on the face of the check (Fig. 6) it would cross the center of the punch receiving hole 16 in the punch head 9 shown in Figs. 3 and 4. The slot 17 in the punch head 9 shown in Fig. 5 and into which the check is placed is wide enough and deep enough to permit the punch head to pass along the opposite sides of the check without damaging it as the carriage 10 is operated. One end of the spring 18 is fastened to the front end of the check receiving carriage 4 as indicated at 18' see Fig. 4 and its other end to the base of the machine as indicated at 18², as shown in Fig. 4. On the front end of the check receiving carriage 4 is a pointer 19, Figs. 1 and 4, for indicating the amount of the check punched prior to its being punched a second time. This pointer passes through a slot 20, Fig. 1, in the upper plate 7. Its function will be referred to in detail in the description of the operation of the machine.

Figure 2:
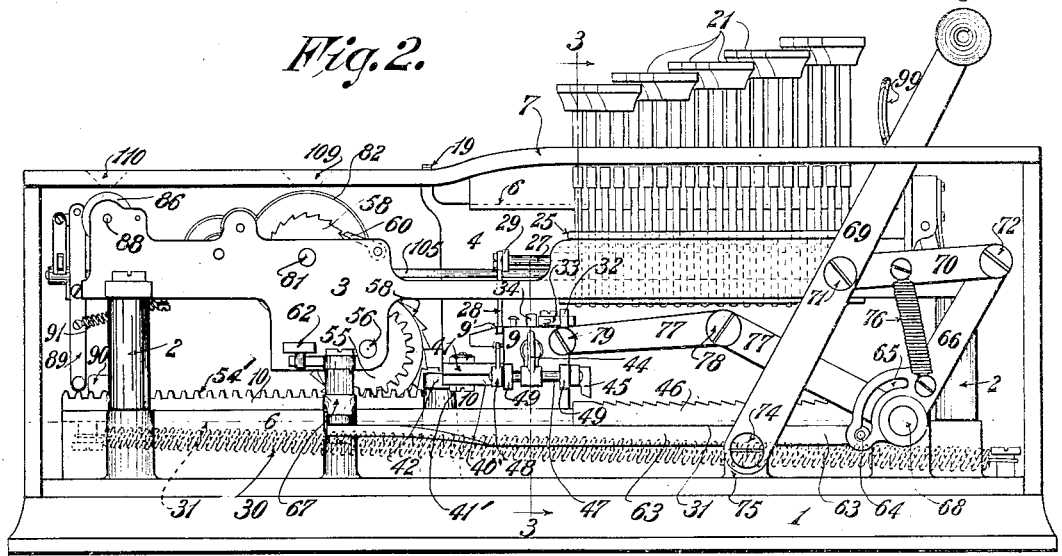
Fig. 2 is a side elevational view of the machine with one side of the casing removed, showing the operating lever and the location of the stop pins on the keys.

In the present construction of the machine twenty depressible keys 21 are arranged as shown in Figs. 1 and 2, in five rows lengthwise the machine, and four rows across. These keys represent twenty amounts, from 5¢ to $1.00, counting in multiples of five. The 5¢ key is the one nearest the punch head 9 and the $1.00 key is the one farthest away from the punch head. Connected to each key by means of a plate 21' is a pin 22 for releasing the punch carrying carriage 10, a stop pin 23, and a lifting or key returning spring 24, Fig. 3. The button stems of the keys pass through openings in the top plate 7. The release pins 22 and the stop pins 23 pass through holes in the spring plate 25, Figs. 2 and 3. The stop pins 23 when depressed, continue downward through holes in the bearing frame 3. The key lifting springs 24 are located on the stop pins 23. They are under compression between the horizontal bar 21' of the keys and the spring plate 25 Fig. 3. The relative locations of the release and stop pins of each key are shown by small circles on the top plan view of the release plate 26, Fig. 5. The center to center distance between the stop pins 23 corresponds with the center to center distance between the blank squares 4² opposite the numerals on the check 4', Fig. 6. The release plate 26 is connected to the shaft 27, Fig. 5. The shaft moves in the lugs 27' and is connected to the latch 28 for locking the punch head 9 against movement by means of the arm 29 in such a way that when the release plate 26 is in the inoperative position shown in Fig. 3, the latch 28 engages a slot 9' in the top of the punch head 9 (see Fig. 2) and holds the crosshead 10 in its neutral or inoperative position against the tension of the main spring 30, shown in dotted lines in Figs. 2 and 3. When the release pin 22, which is connected to a key 21, forces down the release plate 26, the latch 28 is raised from its locking position in the slot 9' of the punch head. The cross head 10 is now free to be drawn forward, or toward the right, by means of the mainspring 30, as shown in Fig. 2. The release plate 26 is open at its center part as shown at 26' Fig. 5 in order to allow the free passage of all of the carriage stop pins 23, but, in the downward movement of the keys 21 the release pins 22, which are attached to the keys, will come into contact with the upper surface of the plate 26, which is held in its neutral or inoperative position by means of the spring 113, Fig. 3, that holds the latch 28 downward.

Figure 3:
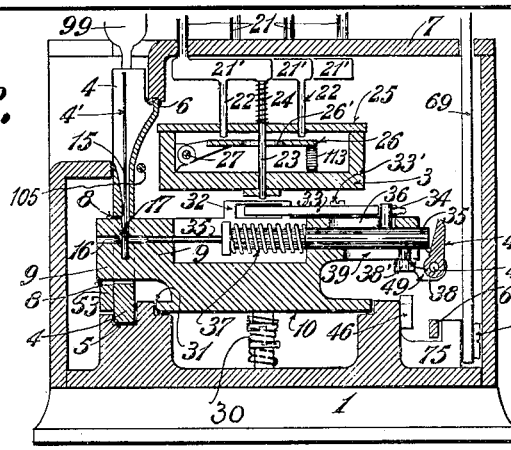
Fig. 3 is a transverse vertical sectional view of the machine taken on the line 3—3 of Figs. 2 and 5, showing the location of the punch in the punch head, and the relation of the check slot in the punch head and carriage.
Figure 4:
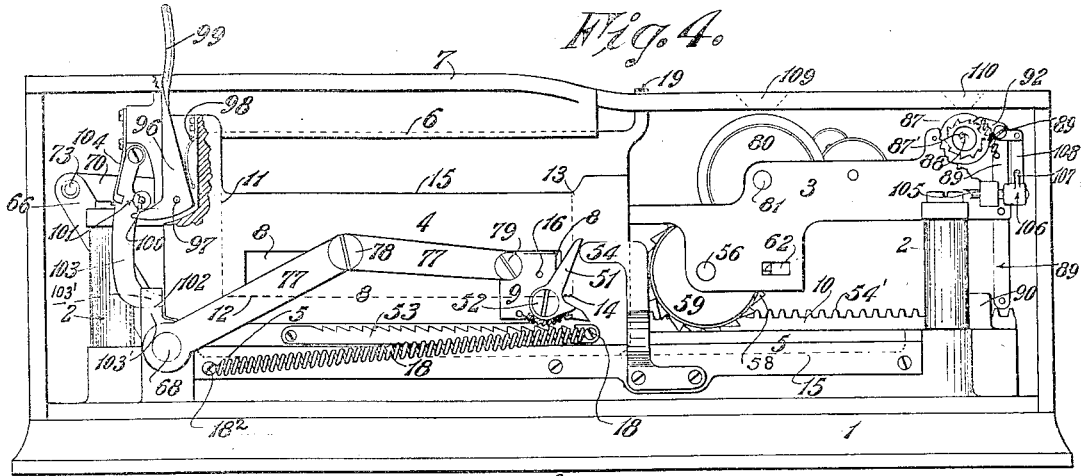
Fig. 4 is a side elevational view of the check receiving side of the machine with that side of the case removed and showing the location of the check receiving carriage, and arrangement of totaling and counting device, and the mechanism for rendering the counting mechanism inoperative when a check is to be repunched.

The cross head 10 moves longitudinally in the tracks 31 shown in the sectional view in Fig. 3, and also designated by the dotted line 31 in Fig. 2. The punch carrying head 9 (see Fig. 5) is located on the front end of the crosshead 10. The travel of the punch rod 35 being at right angles to that of the crosshead. On the front side of the punch head 9 is the stop plate 32, Figs. 2, 3 and 5. This stop plate has a slot through which the curved contact end of the pivoted trigger 33 passes, the pivot being shown at 33'. The locking end of the trigger 33 engages the lock pin 34 which is secured in the top of the punch rod 35 and moves in the slot 36 and therefore holds the punch rod 35 against the tension of the spring 37, (Fig. 3). The cocking pin 38 with a roller 38' on its lower end is secured to the under side of the punch rod 35, and moves in the slot 39 of the crosshead 10, Fig. 3. The cocking lever 40 turns on a bearing on a screw 41' on the lower side of the lug 41 and in operation the end 40² of the punching rod cocking lever 40 comes into contact with the roller 42 which has a free bearing on a screw which is secured to a post that is secured to the base part of the machine. (See Fig. 2.) As the crosshead 10 is returned from its active to its neutral or inoperative position, the pressure of the back end of the punch rod cocking lever 40 against the roller 42 causes the front end of this lever to come into contact with the roller 38', (see Fig. 3). as shown in dotted lines in Fig. 5. The slot 43, Fig. 5, in the crosshead 10, allows the full length of travel of the crosshead without striking the post on which the roller 42 turns.

Figure 5:
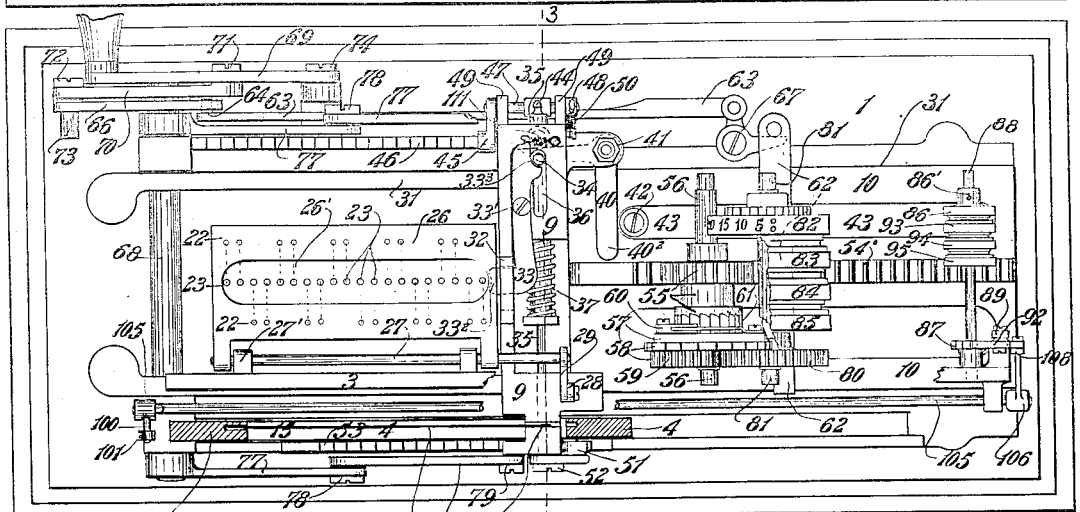
Fig. 5 is a top plan view of the machine with the top plate of the case removed and also with the spring plate and bearing frame removed, to show the relative location of the dial shafts, crosshead, and release plate.
Figure 6:
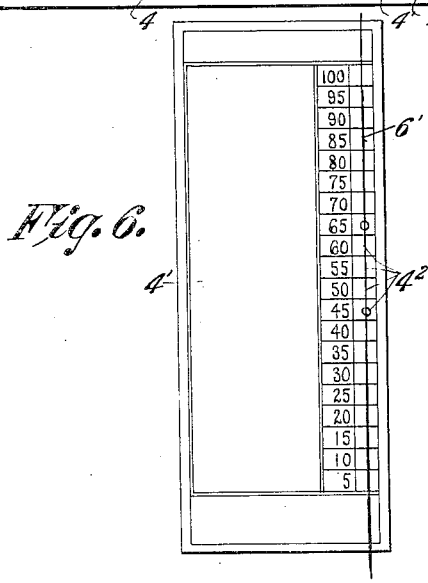
Fig. 6 is a view showing the face of the check designed to be used in the machine.

When the punch rod 35 is in the cocked or retracted position shown in Fig. 3, its large end bears against the lever arm 44, holding the safety or carriage retaining pawl 45 away from the fixed rack 46 shown in Figs. 2 and 5. This rack has twenty teeth, the face to face distance of which corresponds with the center to center distance of the blank squares 4² opposite the numerals on the check 4' shown in Fig. 6. The shaft 47 carrying the lever arm 44 (Fig. 5) the retaining pawl 45 and the spring arm 48, has a free bearing in the lugs 49 on the end of the punch head 9, and the spring 50, Fig. 5, secured to the punch head 9 and to the spring arm 48 holds the retaining pawl lever arm 44 against the large end of the punch rod 35 when in neutral or inoperative position, and also moves the carriage retaining pawl 45 into engagement with the rack 46 which is fastened to the base of the machine, when the punch rod 35 moves forward.

The pawl 51 (Fig. 4) which is for moving the carriage 10, has a pivotal connection with the punching end of the punch head 9, by means of the screw 52. This pawl 51 is normally held away from the rack 53 on the carriage 4 by means of the stop arm 54, Fig. 4, but immediately engages the teeth of the rack 53 when any one of the keys are depressed to release the carriage 10 and its punch head 9. The carriage rack 53 has twenty teeth, the pitch or face to face distance of which corresponds with the center to center distance of the blank squares 4² opposite the numerals on the check 4' shown in Fig. 6. Secured to and extending lengthwise of the crosshead 10 (Fig. 5) is the pinion rack 54' which engages the ratchet pinion 55 that turns freely on the shaft 56, which is fixed to the part 3 of the frame work of the machine. There are twenty teeth in the gear end of the ratchet pinion 55, the tooth pitch of both rack and pinion corresponding with the center to center distance of the blank squares on the check 4', Fig. 6. The rack 53 on the check carriage 4 is for the purpose of moving or carrying along the check carriage 4 with the punch head 9 until the return movement of the latter to the neutral or inoperative position releases the check from the punch rod 35.

On the end of the shaft 56 is keyed the pawl plate 57, the lock-ratchet 58 and the gear 59. In the forward movement of the crosshead 10, the ratchet pinion 55 turns idly on the shaft 56, and the teeth in the ratchet end of the ratchet pinion are not engaged by the pawl 60, Fig. 5, but slip idly thereover. In the return travel of the crosshead 10 to its neutral or inoperative position by means of the lever 69, however, the ratchet tooth corresponding with the distance traveled engages the pawl 60 causing the gear 59 to turn. The pawl 60 is held against the surface of the ratchet pinion 55 by means of the spring 61. The ratchet pinion 55 has twenty ratchet teeth to correspond with the twenty teeth of the pinion. The lock rachet 58 is engaged by the reciprocating locking bar 62 (Figs. 2, 4 and 5) to retain this ratchet and gear 59 in an inoperative position. On the rear end of the reciprocating bar 63, Fig. 2, the pin 64 engages cam slot 65 of the cam lever 66 and when this lever 66 is drawn forward for operating the sales totaling register, the bar 63 moves in the direction of the cam lever, causing the rocker or bell-crank lever 67 to swing in such a way that the locking bar 62 is withdrawn from contact with the teeth of the locking ratchet 58, Fig. 4. The cam lever 66 is pivotally connected to the cross-shaft 68, and is connected to the lever 69 by means of the link 70 by means of screws 71 and 72, Fig. 2.

On the inner end of the screw 72 is the pin 73 (Fig. 5) the purpose of which will be referred to later in the operation of the machine. The lever 69 is pivotally connected to the screw 74 in the base lug 75 shown in Figs. 2 and 3. The lever 69, when pulled forward and released by the operator is automatically returned to the position shown in Fig. 2, by the spring 76, which causes the cam lever 66 and link bar 70 to fold at the hinge point designated by the screw 72. The hinged draw bars or links 77, it will be observed, are alike on both sides of the machine and are keyed in alinement to the cross shaft 68, but have pivotal connection with each other at 78, and also with the crosshead 10 at 79 at opposite ends of the punch carrying head 9. The gear 59 engages the gear 80 which is keyed to the dial shaft 81. The dial 82 is keyed to the dial shaft 81, Fig. 5, and its outer rim face is divided into twenty equal spaces, to correspond with the number of teeth in the pinion rack 54 and the number of blank squares on the check 4' shown in Fig. 6. These spaces are numbered five to one hundred in multiples of five, to correspond with the numbers on the keys 21. The dials 83, 84, and 85, Fig. 5, turn freely on the dial shaft 81, and their rim faces are divided into ten equal spaces, numbered consecutively 0, 1, 2 and so on to 9. The dials are geared in such a way that while 82 is making the last twentieth of its complete revolution, 83 makes one tenth of a revolution; while 83 is making the last tenth of its complete revolution, 84 makes one tenth of a revolution; while 84 is making the last tenth of its complete revolution, 85 makes one tenth of a revolution; and when 85 makes the last tenth of its complete revolution, all dials may be returned to their original positions.

The counter dial 86 and the ratchet 87 are keyed to the shaft 88 as indicated at 86' and 87'. The lower end of the counter lever 89, Fig. 4, is held against the stop 90 on the crosshead 10, Fig. 4, by means of the spring 91, as shown in Fig. 2. When the crosshead 10 moves forward by means of the spring 30, the lever 89 actuated by the spring 91, Fig. 2, moves with it until the pawl 92, Fig. 4, which has a pivotal connection with the lever 89 at 89' at the upper end of the counter lever 89, moves back the length of one tooth of the ratchet 87, and, when the crosshead is returned to its neutral or inoperative position, the stop 90, coming into contact with the lever end of the lever 89, causes the pawl 92 to turn the ratchet 87 one step, and, in so doing, turns the counter dial 86 one tenth of a revolution. The counter dials 93, 94 and 95 have a free bearing on the shaft and are geared in such a way that when 86 is making the last tenth of its complete revolution, 93 makes one tenth of a revolution, and 93, 94 and 95 operate in this same relation to each other.

At the upper rear end of the check carriage 4 shown in Fig. 4, the totaling lever 96 has a pivotal connection on the pin 97, and is held in its vertical position by means of the spring 98. A forward pull on the handle 99 of this lever, toward the right hand, causes its lower end to lift the arm 100, Fig. 5, through contact with the roller 101 and at the same time, the check carriage 4 moves away from the stop 102 on the base. When the arm 100 has been turned or elevated a sufficient distance, or has reached the proper height, the hook space at the top of the swing latch 103 engages the under side of the arm 100, actuated by the spring 104. The arm 100 is keyed to the shaft 105 which extends the full length of the bearing frame 3, Fig. 5. On the opposite end of the shaft 105, the arm 106 is keyed. When the arm 100 is raised by means of the lever 96, the arm 106 is lowered, and the downward movement of the forward end of the latter, which rests in the slot 107 of the connection 108, Fig. 4, causes the pawl 92 to be thrown out of contact with the ratchet 87. In the operation of pulling the totaling lever 96, and the consequent movement of the check carrying carriage 4, from the stop 102, it will be noted that the arm 100 on the shaft 105, remains in its raised position and the pawl 92 is then out of contact with the ratchet 87, as long as the hook space of the swing latch 103 remains directly under the arm 100. It will also be noted that in its movement to its position under the arm 100, the lower or toe end 103' of the swinging latch 103 will project beyond the face of the stop 102. With the return of the check carriage to its neutral position, by means of the spring 18, the rear end of the check carriage 4 comes in contact with the projecting toe 103' of the swing latch 103 and forces it back again into the position shown in Fig. 4, permitting the arm 100 of the shaft 105 to drop back to its original position and at the same time, pawl 92 to again come into contact with the ratchet 87. The lever 96 is used only in totaling, and is not used by the operator in the ordinary operation of the machine in punching a check once, as will be shown in the description of operation.

Referring now to the operation of the machine:

Except for the location of the hole punched in the check, and the amount registered on the sale dials, the operations produced when any one of the keys 21 is depressed is the same. For the purpose of illustrating the use of the machine, a key representing, say 45¢, is depressed. The sale dials reading 0 0 0 00 and the counting dials indicating no checks punched, thus 0 0 0 0, through the sights 109, and 110. The key representing 45¢ is the ninth from the center of the machine. The check 4', Fig. 6, with its printed face toward the keys 21, and its highest numeral toward the rear of the machine, is dropped into the slot 15 of the check carriage 4, Fig. 1. The ninth key, representing 45¢, is pressed downward as far as it will go, and the following operations take place:

The downward movement of the key 21 carries the lower end of the punch head stopping pin 23 far enough below the bottom of the pin bearing frame 3 to insure contact with the end $33^2$ of the trigger or latch 33 which normally retains the punch 35 retracted. The release pin 22 forces downward the release plate 26 to which the shaft 27 and the punch carriage locking latch 28 is connected, thus withdrawing the latch 28 from the slot 9' in the punch head 9 thereby permitting the crosshead 10 to move forward actuated by the mainspring 30. With the forward movement of the crosshead 10 and punch head 9, the hinged draw bars or links 77 fold upward, and the carriage moving pawl 51, Fig. 4, moves away from the stop arm 54, and passes idly over the tops of the teeth on the check carriage rack 53. Also, the counter operating lever 89, Fig. 4, has moved forward under the action of spring 91 until the pawl 92 have moved backward a distance of one tooth on the ratchet 87. The crosshead 10 now moves forward under the influence of the spring 30, until the end $33^2$ of the trigger or latch 33 comes into contact with the stop pin 23, and as the latch 33 is moved rearward, the stop pin 23 will contact with the stop plate 32, thus causing the crosshead 10 to stop or come to rest in a position where the small end of the check punching rod 35 is directly in line with the blank space $4^2$ opposite "45", on the check 4', Fig. 6. When the crosshead is brought to rest by engaging the pin 23, the pawl 51 engages in the ninth tooth of the rack 53 on the check carriage 4, counting from the end nearest the center of the machine. The contact end $33^2$ of the punch rod locking trigger 33 having been forced back by the stop pin 23, the locking end $33^3$ of the trigger 33 is released from the pin 34, permitting the punch 35, under the action of the spring 37, to move forward against the check 4' and the small end of the punch to pass through the blank space opposite the number "45" on the check. (See Fig. 3.) As the punch 35 is moved forward for perforating the correct amount on the check 4', the spring 50 through the shaft 47 causes the retaining pawl 45 Fig. 2, to engage in the ninth tooth of the rack 46 counting from the end nearest the center of the machine, thus preventing further forward movement of the crosshead when the key 21 stop pin 23 is released by the operator, and lifted to its original position by the spring 24. The reset lever 69 for the crosshead 10, after the check has been punched, is now drawn rearward by the operator. As it is moved away from its neutral position, shown in Fig. 2, the forward movement of the cam lever 66, which is connected to the lever 69, causes the cam slot 65, by its downward movement, and through the bar 63 and the rocker arm 67, to withdraw the locking bar 62 from its locking position against the tooth of the lock ratchet 58 as shown in Fig. 4. After the hump at the lower end of the cam slot 65 has performed its work of moving the locking bar 62, the travel of the pin 64 in the remainder of the cam slot, keeps the lock bar 62 in its unlocked position, as long as the lever 69 is away from its neutral position, and the shaft 56, which operates the sales disk 82, 83, 84 and 85 is now free to turn.

During the forward movement of the reset lever 69, the pin 73 on the slotted lever 66, when it reaches a position to engage the hinged draw bar or link 77, on the lever side of the machine, will cause the crosshead and check receiving carrier to be drawn together rearward toward the neutral or inoperative position of the crosshead 10. The carriage pawl 51 on the punch head 9, Figs. 4 and 5, being at this time held in engagement with the rack 53 of the check carriage 4, and, the check 4' is still held in the slot 15 of the carriage 4 by means of the punch 35 which is still in the check, will move forward with the punch head 9. As the crosshead 10 begins its return travel to its neutral position, the nearest tooth in the ratchet end of the ratchet 55, Fig. 5, engages the pawl 60, causing the gear 59 to turn the gear 80 and the dial 82, and when the crosshead 10 has reached the position where the latch 28 has dropped into its holding position in the slot 9' of the punch head 9, the rim face of the dial 82 has moved nine of its twenty spaces, and, viewed through the sight 109, Figs. 1, 2 and 4, has stopped with the figures "45" in view. Meanwhile on the same return travel of the crosshead 10, the stop 90, Fig. 4, on the carriage has forced the lever 89 which operates the counting dial 86 6, and lever 89 through it the pawl 92, back to their neutral positions, causing the counter dial 86, when viewed through the sight 110 to read "1", showing that one check has been punched. Near the end of the return travel of the crosshead 10 the rear end of the lever 40, Fig. 5, which withdraws the punch 35 from the check, comes into contact with the fixed roller 42, and the pressure of this lever against the roller resulting from the continued return travel of the crosshead, causes the front end of the locking lever 40 to force the punch 35 back to its initial or neutral position, as shown by the dotted lines in Fig. 5, and the full lines in Fig. 3, where the locking end 33³ of the trigger 33, actuated by the spring 111, engages the lock pin 34 and holds the punch in its neutral or inoperative position. Near the end of the return travel of the crosshead 10, the check carriage moving pawl 51 comes into contact with the stop arm 54 and the pawl being thus lifted from contact with the tooth of the check carriage rack 53, the check carriage, actuated by the spring 18, Fig. 4, will return to its initial or neutral position against the stop 102. With the locking of the punch 35 again in its neutral position, as the crosshead has completed its return travel, the check is now no longer held in locked position by the punch in the slot 15, and on the return of the check carriage to its position against the stop 102 by means of the spring 16, the check, having been properly punched and counted and the amount punched having been indicated on the sale dials may be lifted from the slot 15.

The foregoing describes the ordinary operation of the machine, that is, the punching and recording of a single sale, but it is sometimes desired to add subsequent sales to the same check, without counting the check again. That is to say, without registering the same check as number 2. It is still check number 1. For the purpose of illustrating the manner in which this added sale feature is effected, the same check, for example, will be used again, which has already been punched for a sale representing 45¢ and add a sale of 20¢ to this amount without counting the check a second time. This second operation of the machine is as follows: The check which has already been punched in the 45¢ blank square is again placed in the check receiving slot 15 of the check carriage 4 as already described in the first operation. The totaling lever 96 is now pulled down by means of its handle 99. As the check carriage 4 moves away from the stop 102 the lower end of the totaling lever 96 causes the roller 101 to lift the arm 100 high enough for the hook space in the swing latch 103 to engage the under side of the arm 100, thus preventing the pawl 92 from operating the counter dials, as referred to in the description of the machine. The check carriage 4 is moved forward by means of the handle 99 until the pointer 19 on the check carriage 4, Figs. 1, 2 and 4, is directly opposite the number "45" on the totaling scale 112, Fig. 1. The amount it is desired to add being 20¢, the key 21 marked 20, which is the fourth key from the center of the machine, is pressed down as in the first operation described, and the crosshead 10 is thus allowed to move forward a distance corresponding with that of four blank squares on the check, but the check having been moved toward the punch head the nine spaces represented by the first scale, 45¢, the punch passes through the blank square in the check which represents the total of the nine spaces traveled by the check and the four spaces traveled by the punch head. The punch therefore passes through the thirteenth blank space, which is opposite the number "65". This represents the total of the first sale, 45¢, and the second sale 20¢. The retaining pawl 45 and the carriage pawl 51 have operated the same as in the first operation, except that the safety pawl 45 has engaged in the fourth tooth in the rack 46, and the carriage pawl 51 has engaged in the thirteenth tooth of the rack 53. The crosshead having traveled forward only four spaces, its return to neutral position only causes the registering of four spaces on the sale dial 82, which is thus made to read 65 at the sight 109. The pawl 92 having been thrown out of action by the raising of the arm 100 when the totaling operation was begun, does not engage the ratchet 87 on this return of the crosshead to its neutral position, and the counter dial 86, still reads 1 at the sight 110. As before described, when the check carriage returns to its neutral position against the stop 102, the counter pawl 92 is again placed in readiness for ordinary operation.

What we claim is:

1. In a machine of the kind described, the combination with a check receiving carriage normally held in its inoperative position, of means for moving the carriage away from its inoperative position, movable punch carrying means for punching the check at a point corresponding with the amount of sales made as indicated on the check, key actuated devices for releasing the punch carrying means, means for bringing the punch carrying means to rest at a position in its travel that is opposite the point to be punched in the check, means for releasing the punching means, and means operated by the check receiving carriage for registering the total sum of the sales indicated on the punched check and means operated by the check receiving carriage for counting the number of the punched checks.

2. In a machine of the kind described, the combination with a check receiving carriage normally held in its inoperative position, of means for moving the carriage from its inoperative or check receiving position, means for punching the check at a point corresponding with the amount of sales made as indicated on the check, means for bringing the punching means to rest at a position in its travel that is opposite the point to be punched in the check, means for releasing the punching means, means for indicating the total sum of the sales indicated on the punched check, means for counting the number of the punched checks, and means for rendering the counting means inoperative should the check be punched more than once.

3. In a sales check perforating machine, the combination with a member having a recess to receive the check to be perforated at a point corresponding with the amount of the sales, of a series of keys having numerals thereon corresponding with numerals on the check, a movable perforating device normally retained in a locked position, means for effecting the release of the perforating carrying device from its position of rest as a key is operated, means for moving the punching device, means for stopping the punch carrying device at a point where the check is to be perforated, a check perforating rod, and means for causing the perforating rod to be operated by the punching device stopping means.

4. In a sales check perforating machine, the combination with a member having a recess to receive the check to be perforated at a point corresponding with the amount of the sales, of a series of keys having numerals thereon corresponding with numerals on the check, a carriage, normally at rest and carrying the perforating device, means for effecting the release of the perforating device from its position of rest as a key is operated, means for moving the check perforating device, devices for stopping the perforating devices at a point where the check is to be perforated, a check perforating rod and means for effecting the operation of the perforating rod by the carriage stopping means, means operated by the check receiving member for indicating the total sales, and means operated by the punch carriage for counting the number of checks that have been perforated or sales made.

5. In a sales check perforating machine, the combination with a member having a recess to receive the check to be perforated at a point corresponding with the amount of the sales, of a series of keys having numerals thereon corresponding with numerals on the check, a perforating device normally held in locked position, means for effecting the release of the perforating device from its position of rest as a key is operated, means for moving the perforating device, devices for stopping the perforating device at a point where the check is to be perforated, a check perforating rod, means for effecting the operation of the perforating rod from the movements of the perforating device, means for indicating the total sales, means for counting the number of checks that have been perforated or sales made, and means for permitting the punching of the same check more than once, but rendering the counting means inoperative.

6. In a sales check perforating machine, the combination with a carriage to receive the check to be perforated, said check having spaces to be perforated, of keys the number of which corresponds with the number of spaces on the sales check, which spaces indicate the values of the sales, a check perforating rod, a carriage normally at rest for supporting the check perforating rod, devices operated by the keys for releasing the rod supporting carriage, a rack having a number of teeth, counting from one end, which correspond with the number of keys and the number of the value spaces on the check, means for locking the rod supporting carriage to a tooth of the rack at a point thereof corresponding with the number of the key operated and the number of the value space on the sales check, said perforating rod serving to perforate the sales check at a point corresponding with the value of the space on the check which indicates the value of the sales, and also the number of the key.

7. In a sales check perforating machine, the combination with a member to receive the check, said check having spaces to be perforated, of keys the number of which corresponds with the number of spaces on the sales check, which spaces indicate the values of the sales, a carriage for supporting the perforating device, devices operated by the keys for releasing the perforating device, a rack having a number of teeth counting from one end thereof and corresponding with the number of the keys and the number of value spaces on the check, means for locking the carriage which supports the perforating device to a tooth of the rack at a point thereof corresponding with the number of the key operated, and the number of the value space on the sales check, a punch for perforating the sales check at a point corresponding with the numbered and value of the space on the check which indicates the value of the sales, and also the number of the key, means for registering the total value of sales, means for retaining the perforating device in its perforating position to prevent the removal of the sales check until the registering means has been operated, and counting means for indicating the number of the checks that have been issued, or punched.

8. In a machine of the kind described, the combination with a check receiving member, of means for operating said member, a carriage for supporting the perforating device and normally held in a locked position, a plate, a series of depressible keys for operating the plate, means operated from the plate for releasing the carriage upon the depression of a key, means operated by the key for determining the position the carriage will come to rest after a key has been depressed, a punch for perforating the check, means for releasing the perforating punch when the carriage reaches a predetermined position, and means for operating the punch.

9. In a machine of the kind described the combination, with a check receiving member, of means for operating said member, a locked punching device, a plate, a series of depressible keys for operating the plate, means operated from the plate for releasing the punching device upon the depression of a key, means operated by the key for determining the position the check punching device will come to rest after a key has been depressed, a punch for perforating the check, means for releasing the perforating punch when the punching device reaches a predetermined position, means for operating the punch, and means actuated by the punch carrying device for indicating the amount of the check.

10. In a machine of the kind described, the combination with a check receiving member, of means for operating said member when a check therein is to be repunched, means for holding the member in its normal or check receiving position, a punch carrier, a plate, a series of keys for operating the plate, means operated from the plate for releasing the punch carrying carriage upon the operation of a key, means operated by the key for determining the position the punch carrier will come to rest after a key has been operated, a punch for perforating the check, means for releasing the perforating punch when the punching device reaches a predetermined position, means for operating the punch, and means operated by the punch carrier for counting the number of checks that have been perforated, means for rendering the counting means inoperative when the check receiving carriage is moved for repunching.

11. In a machine of the type described, the combination with a carriage for receiving a sales check for perforating the same at a point adjacent to a series of numerals thereon for indicating the value of the sales, a punching device comprising a single punching element normally held in a locked position, a series of keys spaced from each other a distance equal to the distance between the sales value numerals on the face of the check, means for releasing the punching device when a key of the series corresponding with the longitudinal distance that the depressed key is from the first key of the series, is operated, which position of the punching device when in position for perforating, corresponds with the point on the sales ticket distant from one end thereof that the same is to be perforated to designate a number thereon equal to the position value of the key depressed.

12. In combination with a movable carriage having a rectangular shaped groove for receiving a rectangular shaped sales check having spaced numerals thereon, a series of depressible keys, the number of which correspond with the number of spaced numerals on the check, a punching device, means for releasing the punching device when a key is depressed, means for stopping the device at a predetermined point, a perforating punch, means for releasing the punch by the key when it reaches said point for perforating the check, a sum totaling and a check counting device, means for locking the punching device against movement in either direction, during the punching operation, a returning mechanism for the punching device, said mechanism serving to release the sales registering device and for resetting the punch in its normally locked position.

13. In combination with a sales check receiving carriage, of means comprising a single punch element for perforating the check, means for stopping the perforating means at a predetermined position with relation to the sales values indicated on the check, means for automatically locking the perforating means against movement during the punching operation, reset mechanism for the punching means, means actuated by the return movement of the punching means to its initial position when said mechanism is operated for registering the sales indicated by the checks, and means for registering the number of checks that have been punched and means for returning the check receiving carriage to its initial position after the punch mechanism is reset.

14. In a machine for perforating sales checks comprising in combination, a carriage to receive the check to be punched, a movable member carrying the punch, means for locking the member against movement, a series of keys for releasing the movable member, a rack, counters for recording the sales, means for rendering the counters inoperative during the forward travel of the carriage, means for operating the sales counters during the return reset movements of the punch carrying member, comprising a punch reset mechanism operated by the check carriage, and means for counting the number of checks that have been punched.

15. In a sales check perforating machine, the combination with a check receiving carriage, a punch carriage normally retained in a locked position, means to automatically move the punch carriage when released, devices operated by the check carriage for returning the punch carriage to its normal position, and for utomatially relocking the same, means for automatically withdrawing the punch from the check as the punch carriage is relocked to permit the removal of the punched check, means for permitting repunching the sales check to indicate a different value, and means for registering the different value.

16. In a machine for perforating sales checks, the combination with a carriage to receive the check to be perforated, said carriage being normally held against movement, a punch, a carriage for moving the punch into its perforating position with relation to the value on the check to be perforated, means operated by the check carriage for withdrawing the perforating punch from the check, means for moving the check carriage from its position of rest toward the punch carriage for the purpose of positioning the check for punching an additional value on the sales check after having been punched, and the punch carriage is repositioned for the second operation.

17. In a machine for perforating sales checks, the combination with a carriage to receive the check to be perforated, said carriage being normally held against movement, a punch, a carriage for moving the punch into its perforating position with relation to the value on the check to be perforated, means for withdrawing the perforating punch from the check, means for moving the check carriage from its position of rest toward the punch carriage for the purpose of retaining the check in its locked position in the check carriage until the value of the check has been registered, and for the purpose of positioning the check for punching an additional value on the sales check after having been punched, and the punch carriage is repositioned for the second operation, means for registering the total value of the punched check and means for counting the number of the punched checks, said counting means only operating to register the number of the punched check but once.

18. In a machine for perforating sales checks, the combination with a movable check receiving member, a single punch carrier carriage normally held against movement, means including a key for releasing the carrier when a key representing the value of the sale is operated, means controlled by the key for bringing the carrier to rest so that the punch will stand opposite the point on the check to be perforated by the punch, means for locking the carrier against movement in its punching position after the operator releases the key and means including the check receiving member for returning the punch carrier device to its initial position and simultaneously operating a total sales and a counting register.

19. A machine for perforating sales checks, the face side of which is provided with a column of numerals for indicating the value of sales or purchases, a check receiving member, movable means for perforating the check at a point corresponding with purchase numerals on the check, a register device to indicate the total value of the sales, means to prevent the removal of the check from the perforating means until the registering device has been operated and means for counting the number of the check as the punch carrying means is returned to its initial position, and means for rendering the counting means inoperative should the check be inserted and perforated more than once.

20. A device of the kind described, comprising in combination with a carriage to receive a check bearing numerals indicating values, to be perforated, of a carriage supporting punch, a series of keys bearing numerals corresponding with the numerals on the check for releasing the punch, and for automatically positioning the punch at a point with relation to the numerals on the check for perforating the same at a point corresponding to the value of the key actuated, means operated by the punch carriage for indicating the value of the perforated check, means for indicating the number of the check, means for retaining the check in a locked position until after the value and number of the check has been indicated, and means for moving the punch carriage to effect the release of the check and to reposition the punch carrying carriage prior to a subsequent series of operations.

21. In a sales check perforating machine, the combination with a check receiving carriage, said check having numerals thereon, a punch carriage normally retained in a locked or inoperative position, a series of keys for automatically releasing the punch-carriage when a key is operated, reset mechanism for returning the punch-carriage comprising a lever, pivotally connected links between the lever and the punch carrying carriage to effect the return movement of the punch carrying carriage, means operated by the said movement of the punch carrying carriage for causing the automatic return movement of the check receiving carriage.

22. In a machine for perforating sales checks bearing numerals thereon and comprising, in combination, a carriage to receive a sales check to be perforated, means for moving said carriage from its initial check receiving position, a carriage for supporting the check perforating device, means for moving the perforating device from its initial position, means for resetting the punch carriage in its initial position after the check is perforated, means for locking the perforated check in the check carriage until the punch carriage has been returned to its initial position, and means for returning the check receiving carriage to its initial position after the punch has been withdrawn from a perforated check, as described.

23. A machine for perforating sales checks, comprising, in combination, a check-receiving member, a perforating punch-carrying member, a pawl on the punch carrying member, a rack on the check receiving member, the pawl and rack being normally disengaged, means to effect the engagement of the pawl and rack when the punch carrying member is released, means for releasing the punch carrying member, means for automatically resetting the punch carrying member, as the check receiving member is moved toward the punch receiving member, and means for automatically disengaging the pawl and rack from each other to permit the automatic return of the check receiving member after the punch carrying member is in its reset position, the punch serving to retain the check locked in the check receiving member until the return of the punch carrying member to its initial position, as described.

24. A machine for perforating sales checks, comprising in combination, a check receiving member, a perforating punch carrying member, a pawl on the punch carrying member, a rack on the check receiving member, the pawl and rack being normally disengaged to effect the engagement of the pawl and rack when the punch carrying member is released, means for releasing the punch carrying member, means for automatically resetting the punch carrying member, as the check receiving member is moved toward the punch receiving member, and means for automatically disengaging the pawl and rack from each other to permit the automatic return of the check receiving member after the punch carrying member is in its reset position, the punch serving to retain the check locked in the check receiving member until the return of the punch carrying member to its initial position, means for indicating the value of the punched check, and means for counting the number of the check, said means being automatically operated by the return movement of the punch carrying member, as described.

25. A machine for perforating sales-checks, comprising in combination, a check receiving member, a perforating punch carrying member, a pawl on the punch carrying member, a rack on the check-receiving member, the pawl and rack being normally disengaged, means to effect the engagement of the pawl and rack when the punch carrying member is released, means for releasing the punch carrying member, means for automatically resetting the punch carrying member as the check receiving member is moved toward the punch receiving member, and means for automatically disengaging the pawl and rack from each other to permit the automatic return of the check receiving member after the punch carrying member is in its reset position, the punch serving to retain the check locked in the check receiving member until the return of the punch carrying member to its initial position, means to permit of repunching the check to indicate an additional value, and means for rendering the check counting means inoperative during the repunching of the additional value on the check and the reset operations of the punch carrying member, as described.

26. A sales-check perforating machine, comprising in combination, a carriage to receive the check to be perforated, a punch carrying carriage, said latter carriage being capable of independent operation, means for operating the punch carrying carriage from the check receiving carriage to reset the punch carriage, means for automatically returning the check-carriage to its initial position after the punch carriage has been reset.

27. In a sales-check perforating machine, the combination with a member to receive the check to be perforated, the check having value figures thereon, a movable member for perforating the check adjacent said figures, means for indicating the value of the check after it has been perforated, means for normally retaining the value indicating means inoperative, reset devices for the perforating means, said devices coöperating with the perforating member to release and operate the value indicating means, and means operated by the reset devices for indicating the number of the check that has been perforated.

28. In a sales-check perforating machine, the combination with a member to receive the check to be perforated, the check having value figures thereon, a movable member for perforating the check adjacent said figures, means for indicating the value of the check after it has been perforated, means for normally retaining the value indicating means inoperative, reset devices for the perforating means, said devices coöperating with the perforating member to release and operate the value indicating means, means operated by the reset devices for indicating the number of the check that has been perforated, and means to permit reperforating the check to indicate a different value, causing the operation of the value indicating means, but not the operation of the number or check counting devices.

29. In a sales-check perforating machine, the combination with a movable check-receiving member, of a movable perforating member, a series of keys having numbers thereon corresponding with the value numbers on the check, means controlled by the keys for positioning the perforating member therefor with relation to the values on the check and for operating the same, means for resetting the perforating member by moving the check receiving member with the perforating member until the latter is in its inoperative position, and means for automatically returning the check receiving member to its normally inoperative position.

30. In a sales check perforating machine, the combination with a check receiving member, of a movable check perforating member, a series of keys, means for releasing and positioning the perforating member with relation to the value numerals on the check, reset mechanism for the perforating member, means for retaining the check locked in the receiving member until the reset mechanism has reset the perforating member, and means operable by the reset mechanism for automatically indicating the value of the check.

CHARLES W. BRITCHER.
JOSEPH ROMEO VEZINA.